INVENTOR.
FRANK H. FELLOWS
AND HARRY E. WEAVER
BY

Patented Oct. 23, 1951

2,572,253

UNITED STATES PATENT OFFICE 2,572,253

FLOW AND TEMPERATURE RESPONSIVE FLUID CONDITIONING SYSTEM

Frank H. Fellows, Cleveland, and Harry E. Weaver, South Euclid, Ohio, assignors to Bailey Meter Company, a corporation of Delaware Application December 24, 1947, Serial No. 793,750

9 Claims. (Cl. 236—23)

This invention relates to fluid conditioning systems, and more particularly to systems in which one fluid is brought to a predetermined condition by another conditioning fluid.

It is sometimes desirable to heat a flowing fluid, such as water, to a predetermined temperature, and to regulate the heating so that the temperature will never vary more than a small amount from the desired value. If the rate of fluid flow varies a considerable amount, or if the heat content of the heating medium varies, then any device operating alone in response to changes in the temperature of the heated fluid would be insufficient to maintain a close regulation of the temperature. With any such arrangement there would necessarily be a change in temperature before the device operated to produce a regulating action, and there may be some delay before changes in the flow of fluid or the supply of the heating medium caused any change in the temperature. By the time that the temperature responsive device has started its control there may be such a rapid change taking place in the temperature that it would go well beyond the desired value. The device would tend to over-regulate in correcting the condition, and then the temperature would be caused to change beyond the desired value in the opposite direction.

In another case it may be desirable to regulate the humidity of a gaseous fluid, such as air. In this case, moist air may be supplied to a heat exchanger where it engages surfaces that are cooled by a cooling fluid. Changes in the rate of flow and temperature of the cooling fluid, as well as changes in the rate of flow and humidity of the air supplied, would tend to cause changes in the humidity of the air at the point of discharge from the heat exchanger. It may be desirable in some cases to mix fluids or materials that either react chemically to form a different chemical substance or merely form a predetermined mixture. In any of the cases, variations in the conditions or compositions of the fluids or materials supplied would tend to produce variations in the conditions and compositions of the fluid or material obtained.

By providing means responsive to varying conditions of the different fluids supplied, it is possible to obtain controlling actions by such means before changes in conditions of the resulting fluid actually take place. When such means are combined in a system with other means responsive to changes in the conditions of the resulting fluid, there may be obtained a control in the supply of fluid or material to maintain the resulting fluid very close to the desired condition. In applying our invention to the heating of one fluid by another, there may be included means responsive to the rate of flow and temperature of the fluids as supplied to a heat exchanger through separate conduits. The flow in either one or both of the conduits may be regulated by such means so that the temperature of the heated fluid is brought to the desired value. Another means responsive to the temperature of the heated fluid at the discharge side of the heat exchanger may be provided for effecting further regulation of the fluid supplied. A control of the supply in response to the variable conditions at these three points assures a very close regulation of the temperature.

An object of our invention is to provide an improved system for controlling the conditioning of a fluid. Another object is to provide an improved system for controlling the supply of fluid to a fluid conditioning apparatus in such a manner that the conditioned fluid meets the desired requirements. Yet another object is to provide means responsive to variable conditions of different fluids supplied to a conditioning apparatus and operating to control the supply. Still another object is to control the supply of a heating medium to a heat exchanger so as to heat a variable flow of fluid to a predetermined temperature. Other objects will appear in the course of the following description.

There are shown in the accompanying drawings for purposes of illustration, two forms which our invention may assume in practice.

Figure 1:
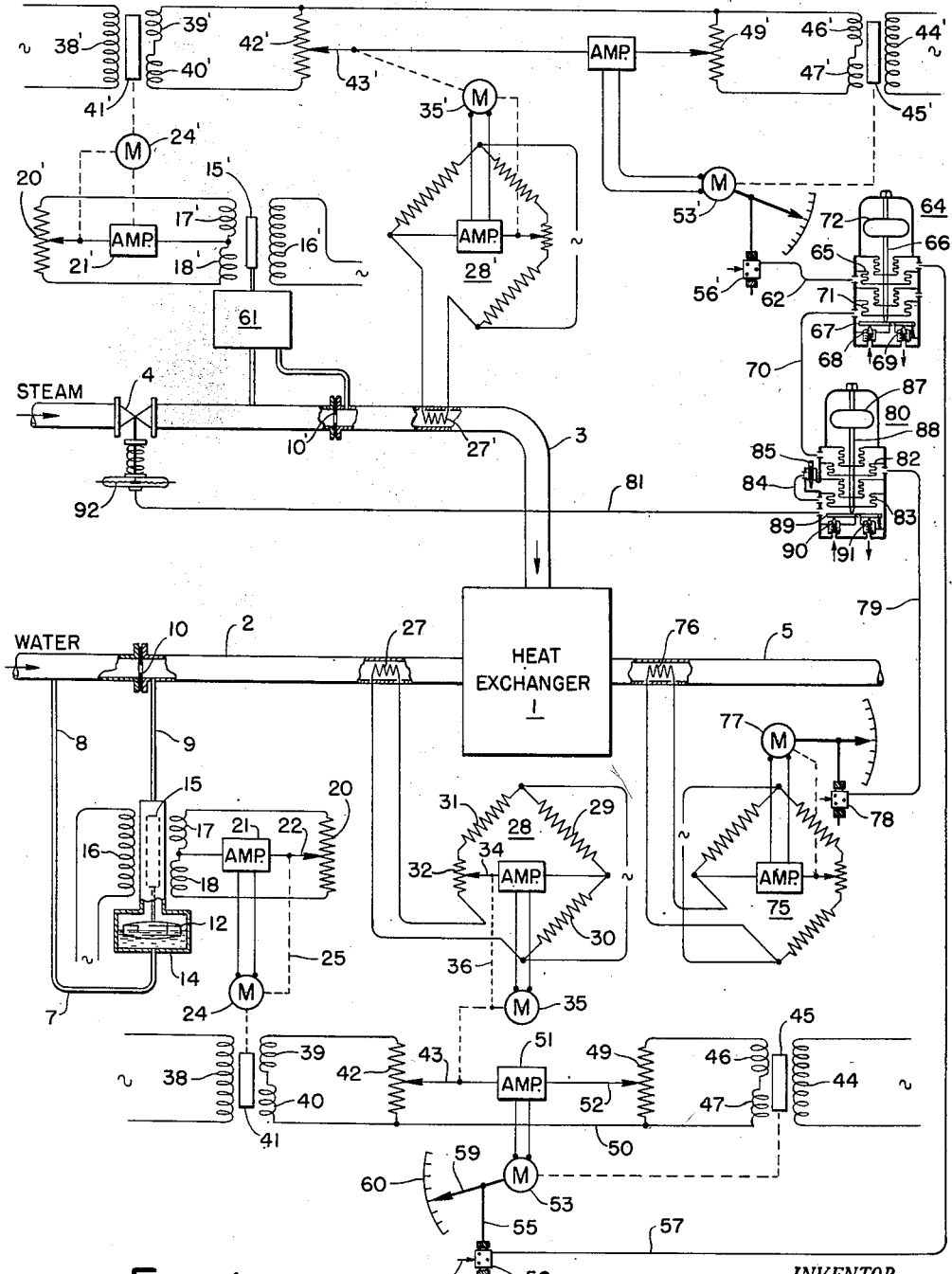
Fig. 1 is a schematic diagram showing the control system including electric circuits responsive to varying conditions and producing the necessary controlling actions.

Referring to Fig. 1 it will be noted that there is shown a heat exchanger 1 having fluid, such as water, supplied thereto through a conduit 2. A heating medium, such as steam, is supplied through a conduit 3 to the heat exchanger for heating the water, and a valve 4 in the steam line is adapted to be positioned by control means shortly to be described, for controlling the supply of steam so as to maintain a desired temperature of the water in a conduit 5 leading from the heat exchanger. The heating medium may be dis- charged directly into the water where it is condensed and discharged with the heated water through conduit 5, or it may be conducted through separate passage means in the heat exchanger to a point of exhaust. Separate passage means may be necessary when the fluid to be heated is a liquid other than water.

The varying conditions of the fluids in conduits 2 and 3 selected for effecting the desired controlling actions are the rate of fluid flow and the temperature of the fluid. In some cases it may be desirable that other variables, such as pressure, be employed in determining the controlling actions, and it is only necessary then to substitute a suitable pressure responsive device for one of the devices shown. To obtain a control representative of the rate of flow in conduit 2 there is provided a U-tube 7 having its legs 8 and 9 communicating with the conduit at opposite sides of an orifice 10. A liquid, such as mercury, is contained within the U-tube and is acted upon by the pressures at the opposite sides of the orifice to determine the position of a float 12 in a chamber device 14 forming part of the U-tube. A core member 15 is carried by the float 12 for magnetically coupling a transformer primary winding 16 to a pair of secondary windings 17 and 18 connected in bucking relation. The outer ends of the secondary windings are connected to the ends of a potentiometer resistance 20, and a point between the secondary windings is connected through an amplifier and motor control device 21 to a sliding contact 22 of the potentiometer. The amplifier and motor control device may be like that disclosed in the Ryder Patent 2,275,317, and need not be described here in detail. It is only necessary to say that a motor 24 is energized by the device 21 when a voltage exists between the contact 22 and the point between the secondary windings, and the motor is connected by suitable means 25 to the contact 22 for positioning the latter in a direction to rebalance the circuit. When the core member 15 is centered with respect to the secondary windings, the voltage drops in these windings are equal and the voltage drop across the device 21 is zero when the contact 22 engages the potentiometer resistance 20 at its mid point. Any change in the flow of water in conduit 2 results in a movement of the core member to effect an increase in the potential induced in one of the secondary windings and a decrease in the other secondary winding. A voltage drop across the device 21 then exists, and the motor 24 is energized to position the contact 22 until the circuit is rebalanced.

To obtain a control respresentative of the temperature of the water supplied to the heat exchanger, there is provided an element 27 in conduit 2 varying in resistance in response to changes in temperature. The element 27 is connected in a bridge circuit 28 including fixed resistances 29 and 30 forming one pair of its legs, while the resistance 27 and a resistance 31 combined with portions of a resistance 32 form the other pair of legs. An amplifier and motor control device, similar to the device 21, is connected between a movable contact 34 and a diagonally opposite point of the bridge, while the other diagonal of the bridge is connected to a source of A.-C. A motor 35 is energized by the amplifier on bridge unbalance, and the motor is connected through connections 36 to the contact 34 for positioning the latter to rebalance the bridge.

It will be appreciated that operations of the motors 24 and 35 will be representative of changes in the rate of flow and temperature, respectively, in conduit 2. In order that a single controlling force representative of some function of these variables may be obtained, there is provided a balanceable network including a transformer having a primary winding 38 and a pair of secondary windings 39 and 40 which are connected in series bucking relation. The primary winding is energized from a suitable source of A.-C. and is magnetically coupled to the secondary windings by a core member 41 operatively connected to the motor 24. A potentiometer resistance 42 is connected across the secondary windings and has a movable contact 43 operatively connected to the motor 35. Another transformer has a primary winding 44 energized from a source of A.-C. and magnetically coupled by a core member 45 to a pair of bucking secondary windings 46 and 47. A potentiometer 49 is connected across the secondary windings 46, 47 and has one of its ends connected by a conductor 50 to one end of the potentiometer resistance 42. The movable contact 43 is connected through an amplifier 51 to a manually adjustable contact 52 of the potentiometer 49. The potential drops in the portions of the resistances 42, 49 between the contacts 43, 52 and the conductor 50 oppose each other and, when unequal, cause the amplifier to energize a motor 53 which operates to position the core member 45 in a direction to rebalance the circuit.

The voltage drop across the secondary windings 39 and 40 varies directly with the movement of the core member 41, and the connections between this member and the motor 24 are such that it is positioned in a manner to effect voltage changes across the secondary windings proportional to changes in the rate of fluid flow in conduit 2. The portion of this voltage selected by contact 43 is varied by the motor 35 in direct proportion to changes in the temperature of the water supplied. The actual value of the voltage drop in the resistance 42 between the contact 43 and the conductor 50 is therefore representative of the product of fluid flow and temperature of the fluid delivered through conduit 2. The motor 53 is connected to the valve stem 55 of a pilot valve 56 which determines the pressure in a conduit 57 by variably connecting the latter to a fluid supply connection 58 and to exhaust. This pilot valve is disclosed in the Johnson Patent 2,054,464 and need not be described further herein. The circuit controlling the operation of the motor 53 is so arranged that a movement of the core 41 by an increase in water flow, or a movement of the contact 43 by a drop in water temperature results in an operation of the motor to position the pilot valve so as to increase the pressure in the conduit 57. A decrease in the water flow or an increase in temperature results in an actuation of the valve to decrease the pressure in conduit 57. It will therefore be seen that the pressure is varied directly with the B. t. u.'s demanded to maintain the temperature of the water in conduit 5 at the desired value. A visual indication of changes in the conditions of the water supplied is provided by an indicator arm 59 positioned by the motor 53 relative to a scale 60. A force proportional to the B. t. u. content of the steam is established by a system like that just described in connection with the water supply line. The parts of the system responsive to variables in the steam supply are given primed numbers corresponding to those of the system already described. A device 61, which may be like the U-tube 7, is subjected to the pressures at opposite sides of an orifice 10' in the steam line 3 for positioning a core member 15' to variably couple the primary winding 16' with the bucking secondary windings 17' and 18'. The amplifier 21' operates on a change in the induced voltages in the secondary windings to energize the motor 24' which positions the core member 41'. A bridge circuit 28' is unbalanced when its element 27' located in the steam line is subjected to a temperature change, and the motor 35' is energized on bridge unbalance to rebalance the bridge and position the contact 43'. Positions of the core member 41' and the contact 43' determine a voltage representative of the B. t. u. content in the steam supplied, and this voltage is balanced by a voltage determined by the positioning of a core member 45' from the motor 53'. The voltage representing the B. t. u. content of the steam is obtained by actuating the core member 41' and the contact 43' to unbalance the system in the same direction on changes in the rate of steam flow and temperature in the same direction. A pilot valve 56' is adjusted by the motor 53' to establish a pressure in a conduit 62 directly proportional to the B. t. u. content of the steam supplied.

A relay 64 is provided with a diaphragm 65 which is subjected on its opposite sides to the pressures in the conduits 57 and 62, and a member 66 is connected to this diaphragm for positioning a pivoted beam 67 regulating fluid supply and exhaust valves 68 and 69 to determine the pressure supplied to a conduit 70. A diaphragm 71 is subjected on its lower side to the pressure delivered to the conduit 70, and this diaphragm is also connected to the member 66. A spring 72 acts on the member 66 and is adjustable manually to provide a force determining the pressure differential needed to balance the relay. When the tension of the spring 72 and the pressure on the upper side of the diaphragm 65 are balanced by the pressures at the lower sides of the diaphragms 65 and 71, the relay is balanced and the pressure supplied to conduit 70 is held at a predetermined value. Any increase in the pressure supplied by the conduit 57 results in a corresponding increase in the pressure supplied to conduit 70, and any increase in the pressure supplied by conduit 62 results in a corresponding decrease in the pressure supplied to conduit 70.

The valve 4 in the steam line could be positioned by a pressure, such as that in conduit 70, which is determined only by the conditions of the water and steam supplied to the heat exchanger. This may, however, not always provide a regulation that is close enough to maintain a constant temperature in conduit 5. It is therefore desirable that there be a balanceable bridge network 75 having an element 76 forming one of its legs and varying in resistance in response to changes in the temperature of the water discharged to the conduit 5. An amplifier operates on an unbalance of this bridge to energize a motor 77 which positions a pilot valve 78 to determine the pressure supplied to a conduit 79.

A relay 80 is provided for determining pressures supplied to a conduit 81 in response to variations in the differences between the pressures supplied by conduits 70 and 79. This relay includes a diaphragm 82 subjected on its opposite sides to the pressures in conduits 70 and 79, and a diaphragm 83 subjected on its lower side to the pressure supplied to conduit 81. A conduit 84 connects the lower side of diaphragm 83 in communication with the space at its upper side past a restricting valve 85. The diaphragms 82, 83 and an adjustable spring 87 act on a member 88 which positions a pivoted beam 89 for regulating fluid supply and discharge valves 90 and 91 controlling the flow of pressure fluid relative to the space beneath the diaphragm 83. The relay 80 is disclosed in the patent Re. 21,804 to H. H. Gorrie and need not be described in detail here.

When the relay 80 is balanced, a constant pressure is maintained in conduit 81, and this pressure acts on a diaphragm 92 for holding the valve 4 in a partially opened position. Any increase in the pressure supplied by conduit 70 causes the beam 89 to be actuated for opening the supply valve 90 and increasing the pressure in conduit 81 by a corresponding amount. This pressure passes gradually to the upper side of diaphragm 83 through conduit 84 and causes a continuing unbalance and increase in the pressure supplied to conduit 81 for effecting an opening movement of the valve 4. The pressure increase continues until the pressure differential between conduit 70 and 79 is returned to the value effecting balance by either a dropping of the pressure in conduit 70 or an increasing of the pressure in conduit 79. Any increase in the pressure in conduit 79 results in a continuing decrease in the pressure in the conduit 81 and a closing of the valve 4 until the relay becomes balanced once more.

An increase in the steam flow or steam temperature results in an increase in the pressure supplied to the conduit 62, and this pressure operates the relay 64 to decrease the pressure supplied to conduit 70. The decreased pressure in conduit 70 causes relay 80 to continuously decrease the pressure in conduit 81 for effecting closing movement of the valve 4. An increase in the flow of water or a drop in its temperature results in an increase in the pressure in conduit 57, and this pressure actuates relay 64 to effect an increase in the pressure supplied to conduit 70. Relay 80 is unbalanced by the increased pressure to effect a continuing increase in the pressure supplied to conduit 81 for opening the valve 4. Any change in the temperature of the water discharged from the heat exchanger results in a corresponding change in the pressure supplied to the conduit 79. If the temperature increases, then the pressure increases by a corresponding amount, and this pressure change unbalances the relay 80 to cause a continuing decrease in the pressure in conduit 81 and a closing of the valve 4. A drop in the temperature results in an opening movement of the valve 4 to increase the supply of steam.

Figure 2:
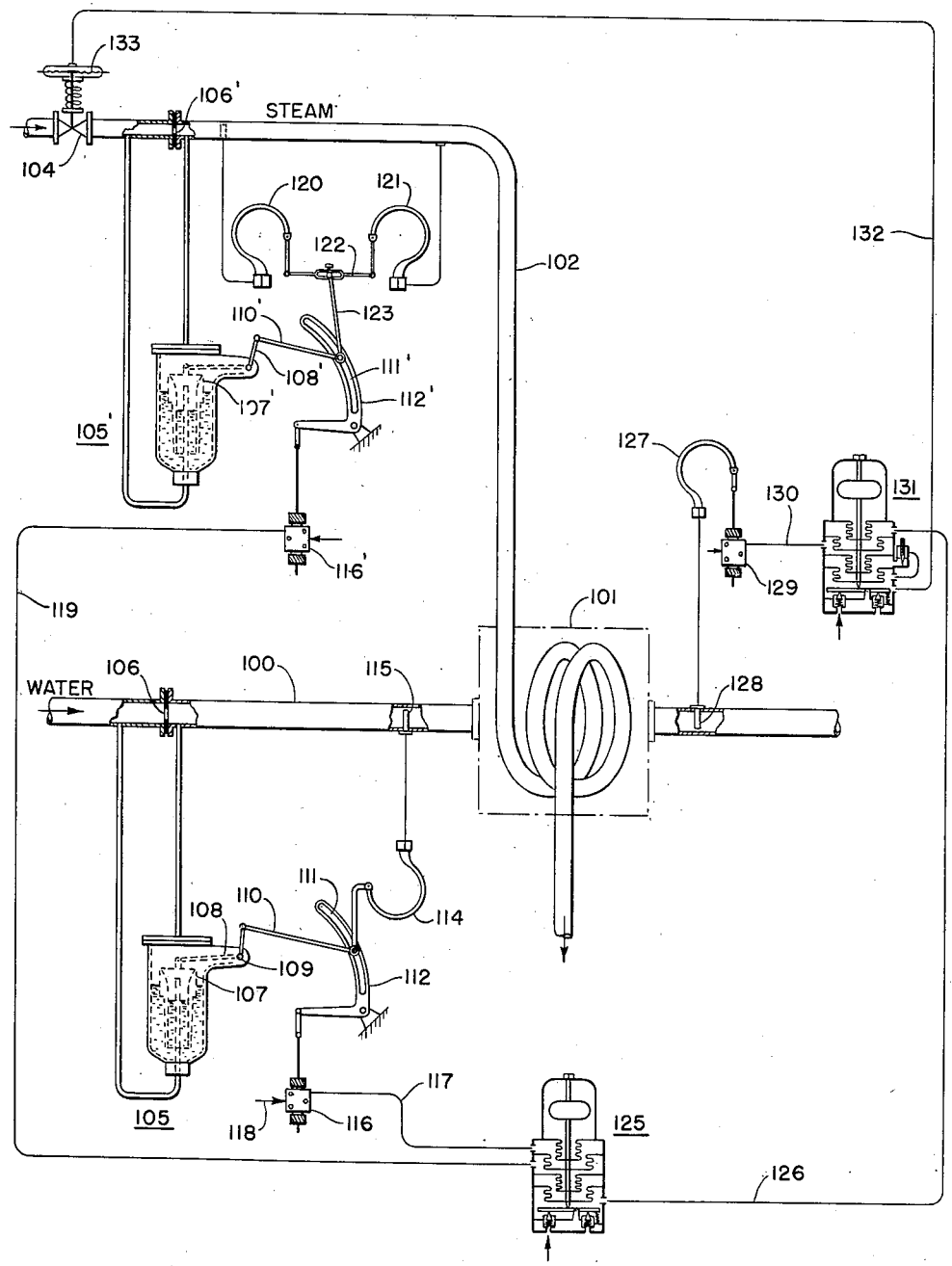
Fig. 2 shows the system including mechanical devices for producing the various controlling actions.

Fig. 2 shows a system providing for a regulation of the steam flow in a manner similar to that of Fig. 1, but mechanically operated means are employed in place of electric networks. In this system a conduit 100 conducts the fluid to be heated through a heat exchanger 101 without direct contact by the heating medium which is supplied through a conduit 102 under the control of a valve 104.

A U-tube 105 is subjected to the pressures at opposite sides of an orifice 106 in the conduit 100, and the pressure differentials across this orifice effect the positioning of a float 107 in direct response to changes in the rate of fluid flow. A bell crank lever 108 is pivoted at 109 and has one of its arms connected to the float while its other arm is connected to a link 110 slideably supported at its free end in a curved slot 111 formed in one arm of a bell crank 112. The position of the link in the slot 111 is determined by a device 114, such as a Bourdon tube, which is connected to a temperature responsive element 115 in the conduit 100 so that it is caused to operate in response to changes in temperature of the fluid to be heated. The other arm of the bell crank is connected to the valve stem of a pilot valve 116 for regulating the pressure supplied to a conduit 117 from a source 118.

Another mechanism similar to that described is provided for determining a pressure in a conduit 119 in response to changes in the rate of flow, temperature and pressure of the heating medium supplied. The parts of this mechanism corresponding to those described have been given primed numbers and include the U-tube 105' in which a float 107' is positioned by pressure differentials across an orifice 106'. A link 110' is connected to one arm of a bell crank 108' actuated by the float, and one end of the link is slideably supported in the slot 111' formed in an arm of a bell crank 112' which regulates a pilot valve 116' supplying pressure fluid to the conduit 119. In this case, however, the position of the link in the slot 111' is determined by devices 120 and 121 responsive to temperature and pressure, respectively, in conduit 102. A member 122 is connected to the devices 120 and 121, and a member 123 connects the member 122 at a point between its ends to the link 110'. The arrangement is such that changes in the temperature and pressure in opposite directions while the B. t. u. content of the steam remains constant, result in no change in the position of the link 110' within the slot 111'. A change in either the temperature or the pressure alone, or a change of both in the same direction, results in an adjustment of the link in the slot.

The pressures in conduits 117 and 119 are supplied to a relay 125 which is like the relay 64 in Fig. 1, and this relay operates in the same manner as relay 64 to regulate the pressure in a conduit 126 so that it is proportional to the difference in pressures in conduits 117 and 119. A device 127 is connected to a temperature responsive element 128 in the conduit 100 at the discharge side of the heat exchanger, and this device operates on changes in temperature to position a pilot valve 129 for supplying fluid to a conduit 130 at pressures corresponding to the temperatures of the heated fluid. A relay 131 like the relay 80 of Fig. 1 is provided for determining pressures in a conduit 132 communicating with a diaphragm 133 which actuates the valve 104.

If steam is supplied to the heat exchanger at a rate, temperature and pressure sufficient to heat the fluid in conduit 100 to the desired temperature, the pressures in conduits 126, 130 and 132 are maintained at constant values and the valve 104 is held in a partially open position. Any increase in flow or decrease in temperature of the fluid in the conduit 100 results in an increase in the pressure supplied by conduit 117 to the relay 125, and this relay operates to produce a corresponding increase in the pressure in conduit 126. The relay 131 then operates to cause an increase in the pressure in conduit 132 for moving the valve 104 to its open position. An increase in the steam flow, temperature or pressure results in a pressure increase in conduit 119 for actuating the relay 125 to cause a decrease in the pressure in conduit 126. This decreased pressure effects actuation of the relay 131 to decrease the pressure in conduit 132 so that the valve 104 moves toward its closed position.

While we have described herein two forms which our invention may assume in practice, it will be understood that the invention may be modified and embodied in various other forms without departing from its spirit or the scope of the appended claims.

What we claim as new and desire to secure by United States Letters Patent is:

1. A heating and control system comprising, in combination, a heat exchanger, means for supplying a fluid to be heated to said heat exchanger, means for supplying a heating fluid to said heat exchanger, valve means for controlling the flow in one of said fluid supply means, means responsive to the flow and temperature of the fluid in said first mentioned supply means for producing an operating force proportional to the B. t. u. needed to bring the fluid in such supply means to a predetermined temperature, means responsive to the flow and temperature of the fluid in said second mentioned supply means for producing an operating force proportional to the B. t. u. contained by said heating fluid, means responsive to said operating forces for producing a pressure proportional to the ratio of such forces, pressure responsive means for controlling said valve means, and means for conducting said pressure to said pressure responsive means.

2. The control system of claim 1 in which the valve means is arranged to control the flow of heating fluid in said second mentioned supply means.

3. A heating and control system comprising, in combination, a heat exchanger, means for supplying a fluid to be heated through said heat exchanger, means for supplying a heating fluid to said heat exchanger, valve means for controlling the flow in one of said fluid supply means, means responsive to the flow and temperature of the fluid in said first mentioned supply means for producing an operating force proportional to the B. t. u. needed to bring the fluid in such supply means to a predetermined temperature, means responsive to the flow and temperature of the fluid in said second mentioned supply means for producing an operating force proportional to the B. t. u. contained by said heating fluid, relay means responsive to said operating forces for producing a first pressure proportional to the ratio of such forces, means responsive to the temperature of the fluid in said first mentioned supply means at the discharge side of said heat exchanger for producing a second pressure proportional to such temperature, relay means responsive to said first and second pressures for producing a control pressure, and pressure responsive means subjected to said control pressure for controlling said valve means.

4. The control system of claim 3 in which said valve means controls the flow of fluid in said second mentioned supply means.

5. The control system of claim 3 in which said valve means controls the flow of fluid in said second mentioned supply means, said pressure responsive means operates on the supply of pressure fluid thereto for opening said valve means, and said relay means operates on an increase in the B. t. u. needed by the fluid to be heated or a decrease the B. t. u. contained by the heating fluid for effecting an increase in said control pressure.

6. A system of the nature described comprising, in combination, a device in which one fluid is conditioned by another, means for supplying a fluid to be conditioned to said device, means for supplying a conditioning fluid to said device, means for conducting the conditioned fluid from said device, means responsive to rate of flow and temperature conditions of the fluids supplied and temperature of the conditioned fluid for producing a controlling action, and means operable by said controlling action for regulating the flow of fluid in one of said fluid supply means.

7. The system of claim 6 in which said last mentioned means includes a valve means for controlling the supply of fluid through said second mentioned supply means.

8. A heating and control system including in combination, a heat exchanger, means for supplying a fluid to be heated to the heat exchanger, means for supplying a heating fluid to the heat exchanger, a valve for controlling the flow of one of the supplied fluids, means responsive to the flow of the fluid to be heated, means responsive to a second variable of the fluid to be heated, means cooperating with the two responsive means for the fluid to be heated for producing an operating force proportional to the B. t. u. needed to bring the fluid to be heated to a predetermined temperature, means responsive to the flow of the heating fluid, means responsive to a second variable of the heating fluid, means cooperating with the two responsive means for the heating fluid for producing an operating force proportional to the B. t. u. contained in the heating fluid, means responsive to the operating forces for producing a third force proportional to their ratio, and means for controlling the valve by the third force.

9. A control system including in combination, a device in which one fluid is conditioned by another fluid, means for supplying a fluid to be conditioned to the device, means for supplying a conditioning fluid to the device, means for conducting the conditioned fluid from the device, means responsive to the rate of flow of the fluid to be conditioned, means responsive to a second variable of the fluid to be conditioned, means cooperating with the two responsive means for the fluid to be conditioned for producing a first controlling action, means responsive to the flow of the conditioning fluid, means responsive to a second variable of the conditioning fluid, means cooperating with the two responsive means for the conditioning fluid for producing a second controlling action, means responsive to a variable of the conditioned fluid for producing a third controlling action, and means operable by the controlling actions for regulating the flow of fluid in one of the fluid supply means.

FRANK H. FELLOWS.
HARRY E. WEAVER.

REFERENCES CITED

The following references are of record in the file of this patent:

UNITED STATES PATENTS

| Number | Name | Date |
|---|---|---|
| 1,897,845 | Hilgers | Feb. 14, 1933 |
| 2,006,035 | Stewart | June 25, 1935 |
| 2,217,636 | Rude | Oct. 8, 1940 |
| 2,268,083 | Rapuano | Dec. 30, 1941 |